United States Patent [19]

Shimizu

[11] Patent Number: 4,799,566
[45] Date of Patent: Jan. 24, 1989

[54] MOTOR-OPERATED POWER STEERING APPARATUS

[75] Inventor: Yasuo Shimizu, Saitama, Japan

[73] Assignee: Honda Giken Kogyo Kabushiki Kaisha, Tokyo, Japan

[21] Appl. No.: 146,662

[22] Filed: Jan. 21, 1988

[30] Foreign Application Priority Data

Jan. 22, 1987 [JP] Japan .................................. 62-13459

[51] Int. Cl.$^4$ ............................................. B62D 5/04
[52] U.S. Cl. .................................................. 180/79.1
[58] Field of Search ...................... 180/79.1, 133, 141, 180/142, 143

[56] References Cited

U.S. PATENT DOCUMENTS

| | | | |
|---|---|---|---|
| 4,458,795 | 7/1984 | Norton | 180/79.1 X |
| 4,532,567 | 7/1985 | Kade . | |
| 4,724,917 | 2/1988 | Naito et al. | 180/79.1 |
| 4,745,985 | 5/1988 | Nakayama et al. | 180/142 |

FOREIGN PATENT DOCUMENTS

62-4672  1/1987  Japan .................................. 180/79.1

Primary Examiner—David M. Mitchell
Assistant Examiner—Charles R. Watts
Attorney, Agent, or Firm—Armstrong, Nikaido Marmelstein & Kubovcik

[57] ABSTRACT

A motor-operated power steering apparatus having a failure diagnosis function for a motor control device includes a steering force transmitting mechanism for transmitting a manual steering force applied to a steering wheel to a steerable road wheel, an electric motor for generating assistive power, an auxiliary power transmitting mechanism for transmitting the assistive power generated by the electric motor to the steering force transmitting mechanism, motor control means for controlling operation of the electric motor in response to the manual steering force, first direction detecting mechanism disposed in the steering force transmitting mechanism for detecting the direction of the manual steering force and generating a signal indicative of the direction of the manual steering force, second direction detecting mechanism for detecting the direction of the assistive power generated by the electric motor and generating a signal indicative of the direction of the assistive power, ascertaining mechanism for ascertaining whether the direction of the manual steering force and the direction of the assistive power are the same as each other based on the signals from the first and second direction detecting mechanisms, and assistive power interrupting means for de-energizing the motor when the direction of the manual steering force and the direction of the assistive power are different from each other.

5 Claims, 5 Drawing Sheets

MOTOR-OPERATED POWER STEERING APPARATUS

BACKGROUND OF THE INVENTION

1. Field of the Invention

The present invention relates to a motor-operated power steering apparatus, and more particularly to a motor-operated power steering apparatus having a failure diagnosis function for a motor control device.

2. Description of the Relevant Art

Motor-operated power steering apparatus have an electric motor for generating assistive steering power, the electric motor being associated with a steering force transmitting mechanism which transmits manual steering forces to steerable road wheels. Operation of the electric motor is controlled dependent on the manual steering force by a motor control device for reducing the manual steering force. The motor control device comprises a control circuit and a driver circuit. The control circuit processes a signal from a sensor which detects the manual steering force, and determines the magnitude and direction of assistive power to be generated by the motor. The driver circuit drives the motor with electric power from a power supply comprising a car-mounted battery based on a signal from the control circuit.

The power supply for the assistive-power generating motor is a low-voltage car-mounted battery. Since the motor rotates at a low speed and produces a high torque, a considerable large current flows through the motor. Therefore, the motor and the control device thereof, particularly the driver circuit having power transistors, produce a large amount of heat. When the power steering apparatus operates in a high-temperature atmosphere or under an excessive load, the driver circuit is subjected to a high temperature, and the motor control device tends to fail due to excessive heat. Accordingly, there have been proposed various efforts for preventing such a motor control device failure.

One of the attempts that have heretofore been made is disclosed in U.S. Pat. No. 4,532,567. In the disclosed arrangement, the current flowing through the motor is detected, and the motor is de-energized when the detected motor current is in excess of a predetermined level.

According to the above system, in the event that the detected motor current exceeds the predetermined level, the motor control device is always determined to have failed, and the motor is de-energized. However, it is known that a large instantaneous current also flows through the motor even when the car is steered on a rough road which imposes a large load on the road wheels, or when a steerable road wheel hits a curb. Therefore, when such a large instantaneous current passes through the motor, the control device is also judged as malfunctioning and no steering assistance is given by the motor even though the control device actually operates properly. For this reason, the conventional failure diagnosis arrangement is not reliable enough. Sometimes, the motor tends to switch repeatedly between energizing and de-energizing modes even if all of the components function normally. When this happens, the driver does not acquire a good steering feeling from the power steering apparatus.

SUMMARY OF THE INVENTION

It is an object of the present invention to provide a motor-operated power steering apparatus which is highly reliably capable of detecting failures of a driver circuit and the like for a motor control device with accuracy and good response.

According to the present invention, a motor-operated power steering apparatus having a failure diagnosis function for a motor control device includes a steering force transmitting mechanism for transmitting a manual steering force applied to a steering wheel to a steerable road wheel, an electric motor for generating assistive power, an auxiliary power transmitting mechanism for transmitting the assistive power generated by the electric motor to the steering force transmitting mechanism, motor control means for controlling operation of the electric motor in response to the manual steering force, first direction detecting means disposed in the steering force transmitting mechanism for detecting the direction of the manual steering force and generating a signal indicative of the direction of the manual steering force, second direction detecting means for detecting the direction of the assistive power generated by the electric motor and generating a signal indicative of the direction of the assistive power, ascertaining means for ascertaining whether the direction of the manual steering force and the direction of the assistive power are the same as each other based on the signals from the first and second direction detecting means, and assistive power interrupting means for de-energizing the motor when the direction of the manual steering force and the direction of the assistive power are different from each other.

When the direction of the manual steering force and the direction of the assistive power are different from each other, i.e., when the assistive power is applied in a manner to counteract the manual steering force, the motor control means is judged as malfunctioning. The motor is now de-energized, and the assistive power is interrupted. Therefore, irrespective of the condition of the road on which the vehicle is running, the failure of the motor control means can reliably be detected. Even if the current flowing through the motor is temporarily increased at the time the vehicle is steered on a rough road, the motor-generated assistive power is not interrupted. The power steering apparatus is thus stable in operation, giving the driver a good steering feeling.

The above and further objects, details and advantages of the present invention will become apparent from the following detailed description of a preferred embodiments thereof, when read in conjunction with the accompanying drawings.

DETAILED DESCRIPTION OF THE PREFERRED EMBODIMENT

Figure 1:
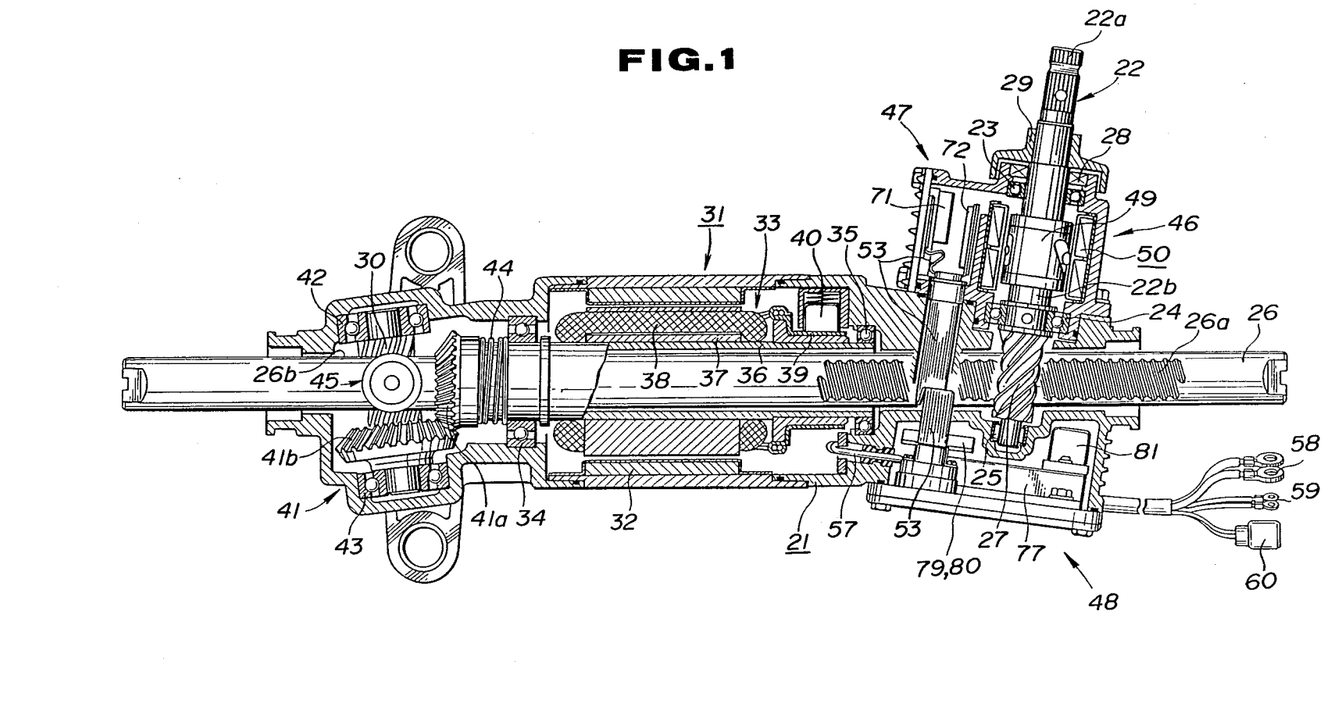
FIG. 1 is a cross-sectional view of a motor-operated power steering apparatus according to the present invention.

As shown in FIG. 1, a gear case 21 is supported on a vehicle body (not shown). A pinion shaft 22 is rotatably supported on a righthand portion (as shown) of the gear case 21 by means of bearings 23, 24, 25. The pinion shaft 22 includes an upper shaft 22a coupled to a steering wheel (not shown) and a lower shaft 22b to which a pinion 27 is fixed. The upper and lower shafts 22a, 22b are coupled to each other by a torsion bar (not shown) such that they can be displaced relatively to each other through a small angle range. A seal member 28 is interposed between the pinion shaft 22 and the upper end of the gear case 21. The seal member 28 and the upper end of the gear case 21 are covered by a dust cover 29 fitted over the pinion shaft 22.

A rack shaft 26 is axially slidably supported in the gear case 21. The rack shaft 26 has axially opposite ends projecting from the opposite ends of the gear case 21 and coupled to the knuckle arms of steerable road wheels (not shown) through respective steering linkages and the like. Therefore, the road wheels can be steered by axial movement of the rack shaft 26 through the gear case 21. The rack shaft 26 has first rack teeth 26a defined on its righthand face and held in mesh with the pinion 27 of the pinion shaft 22, and second rack teeth 26b defined on its lefthand back and held in mesh with a pinion 30.

An electric motor 31 is disposed substantially centrally in the gear case 21 in coaxial relation to the rack shaft 26. The electric motor 31 comprises a field magnet 32 fixed to the inner wall surface of the gear case 21 and a rotor 33 rotatably disposed between the field magnet 32 and the rack shaft 26. The rotor 33 has a cylindrical output sleeve or shaft 36 rotatably supported in the gear case 21 by means of a pair of bearings 34, 35, the output shaft 36 being axially movable a small distance. On the outer peripheral surface of the output shaft 36, there are fixedly and coaxially mounted a laminated iron core 37 having a skew groove defined in its outer periphery and a multiplex armature winding 38 over the laminated iron core 37. The armature winding 38 is electrically connected to a driver unit 48 (FIG. 2) through a commutator 39 fixed to the output shaft 36 and a brush 40 held against the commutator 39. The motor 31 generates a torque commensurate with a current passing through the armature winding 38.

The gear case 21 accommodates, in its space leftward of the motor 31, the pinion 30 meshing with the second rack teeth 26b on the rack shaft 26 and also a skew bevel gear mechanism 41. The pinion 30 is rotatably supported by means of bearings 42, 43 in a position which is not parallel to and does not intersect with the output shaft 36 of the motor 31. The pinion 30 is coupled in power transfer relation to the output shaft 36 of the motor 31 through the skew bevel gear mechanism 41. The skew bevel gear mechanism 41 comprises a driver gear 41a fixed to the lefthand end of the output shaft 36 of the motor 31 and a driven gear 41b meshing with the driver gear 41a and fixed coaxially to the pinion 30. These bevel gears 41a, 41b have a pitch surface in the form of part of a hyperboloid of revolution and gear teeth extending along generatrices. A spring 44 is disposed under compression between the driver gear 41a and the bearing 34 for pressing the driver gear 41a into mesh with the driven gear 41b to remove backlash. A rack guide 45 serves to guide the rack shaft 26 and remove backlash from between the second rack teeth 26b and the pinion gear 30.

Figure 2:
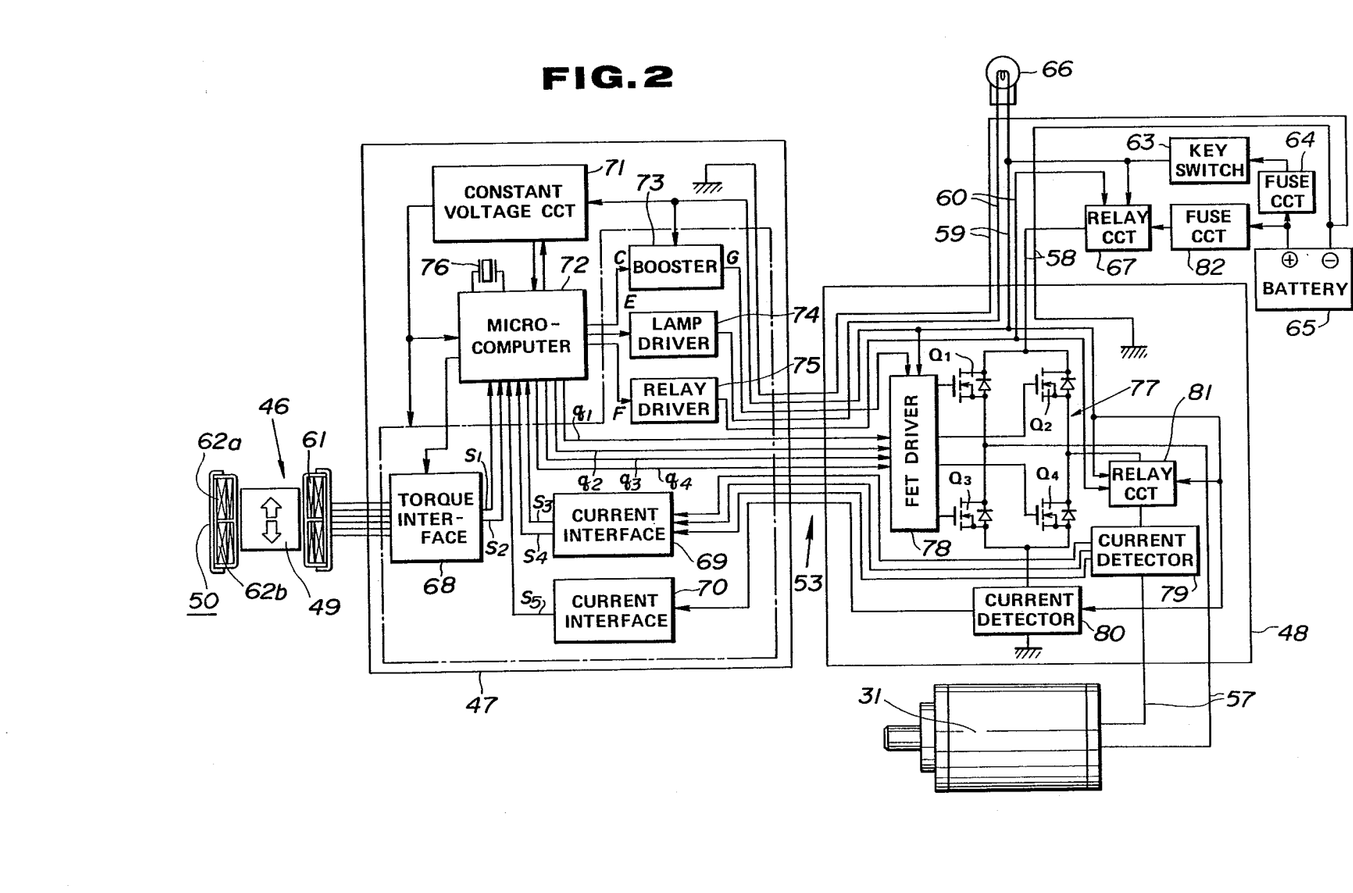
FIG. 2 is a block diagram of a motor control device of the motor-operated power steering apparatus.

A torque sensor 46 and a control unit 47 are disposed on in a righthand portion of the gear case 21 above the rack shaft 26. The driver unit 48 is also disposed in the righthand portion of the gear case 21 below the rack shaft 26. The torque sensor 46 comprises a substantially cylindrical movable iron core 49 through which the pinion shaft 22 extends and a differential transformer 50 disposed around the movable iron core 49. The torque sensor 46 is disposed coaxially with the pinion shaft 22 in the vicinity of the joint between the upper and lower shafts 22a, 22b. The movable iron core 49 is positioned between the upper and lower shafts 22a, 22b and is axially displaceable by a cam mechanism in proportion to relative angular displacement of the upper and lower shafts 22a, 22b which are elastically coupled by the torsion bar i.e., in proportion to a torque applied to the pinion shaft 22. As shown in FIG. 2, the differential transformer 50 comprises a primary coil 61, two secondary coils 62a, 62b, and a compensating ternary coil (not shown), these coils 61, 62a, 62b being electrically connected to the control unit 47. When an AC signal is applied to the primary coil 61 from the control unit 47, the differential transformer 50 issues, as a detected steering torque signal, AC signals induced across the secondary coils 62a, 62b in response to displacement of the movable iron core 49.

The control unit 47 is connected to the driver unit 48 through a flexible cable 53, to a battery 65 via a key switch 63 and a fuse circuit 64 through lead wires 59 from the driver unit 48, and to a warning lamp 66 and a relay circuit 67 through couplers 60 from the driver unit 48.

Details of a control device for the motor 30, which comprises the control unit 47 and the driver unit 48, will be described with reference to FIG. 2.

The control unit 47 includes a torque interface 68 for the torque sensor 46, current interfaces 69, 70 for current detection, a constant voltage circuit 71, a microcomputer 72, a booster 73, a lamp driver 74, and a relay driver 75. The torque interface 48 frequency-divides a clock signal applied from the microcomputer 72 and applies an AC signal to the primary coil 61 of the torque sensor 46. The torque interface 48 also rectifies, smooths, and compensates for phase output signals from the secondary coils 62a, 62b of the torque sensor 46 to apply signals S1, S2 (FIG. 4) to the microcomputer 2. The current interface 69 amplifies an output signal from a current detector 79 which detects a current directed to the motor 31, and applies signals S3, S4 (FIG. 5) to the microcomputer 72. Likewise, the current interface 70 amplifies an output signal from a current detector 80 which detects a current directed to a switching circuit (described later), and applies a signal S5 indicative of the magnitude of the detected current to the microcomputer 72.

The microcomputer 72 processes the signals S1, S2, S3, S4, S5 applied from the interfaces 68, 69, 70 according to a program stored in a memory such as a ROM, and applies signals E, F to the lamp driver 74 and the relay driver 75, respectively, a signal C of a prescribed frequency to the booster 73, and signals q1, q2, q3, q4 of prescribed frequencies to the driver unit 48. The lamp driver 74 is connected to the warning lamp 66 disposed near the driver's seat through the flexible cable 53 and the coupler 60. In response to the drive signal E from the microcomputer 72, the lamp driver 74 energizes the warning lamp 66. The relay driver 75 is connected to a relay circuit 81 in the driver unit 48 through the flexible cable 53 and also to the relay circuit 67 through the flexible cable 53 and the coupler 60. In response to the drive signal F from the microcomputer 72, the relay driver 75 closes the contacts of the relay circuits 67, 81. The booster 73 is connected to the driver unit 48 and increases the voltage of the signal C applied from the microcomputer 72 to a level which is twice the voltage of the battery 65, thereby producing a signal G. The constant voltage circuit 71 is connected to the battery 65 via the flexible cable 53 and the lead wires 69. The constant voltage circuit 71 keeps the voltage from the battery 65 at a constant level, and supplies the constant voltage to the circuits of the control unit 47. A crystal oscillator 76 applies a reference clock signal to the microcomputer 72.

The driver unit 48 includes a switching circuit 77, an FET driver 78, current detectors 79, 80, and a relay circuit 81. The switching circuit 77 comprises a bridge of four field-effect transistors (FET) Q1, Q2, Q3, Q4. The FETs Q1, Q2 have drain terminals connected to the battery 65 via the relay circuit 67 and a fuse circuit 82 through the lead wires 58. The FETs Q1, Q2 have source terminals coupled to the drain terminals of the FETs Q3, Q4, which have source terminals grounded. The motor 31 is connected between the source and drain terminals of the FETs Q1, Q3 and also between the source and drain terminals of the FETs Q2, Q4 through lead wires 57. The FETs Q1, Q2, Q3, Q4 have gate terminals connected to the FET driver 78. In response to drive signals from the FET driver 78, the switching circuit 77 simultaneously or selectively turns on the pair of FETs Q1, Q4 or the pair of FETs Q2, Q3 for controlling the direction and value of a current to be passed through the motor 31. The FET driver 78 is supplied with the increased voltage G from the booster 73, the voltage from the battery 65, and the signals q1, q2, q3, q4 from the microcomputer 72. The FE driver 78 drives the gates of the FETs Q1, Q2, Q3, Q4 with these signals q1, q2, q3, q4. The signal ql corresponds to the FET Q1, the signal q2 to the FET Q2, the signal q3 to the FET Q3, and the signal q4 to the FET Q4.

The relay circuit 81 has contacts connected between the switching circuit 77 and the motor 31, and opens these contacts in response to a signal from the relay driver 75 for thereby de-energizing the motor 31. The current detector 79 is connected between the switching circuit 77 and the motor 31 for detecting the direction and magnitude of a current flowing through the motor 31. The current detector 80 is connected between the switching circuit 77 and ground for detecting a current flowing through the switching circuit 77. The current detector 79 is connected to the current interface 69, and the current detector 80 is connected to the current interface 70.

Figure 3A:
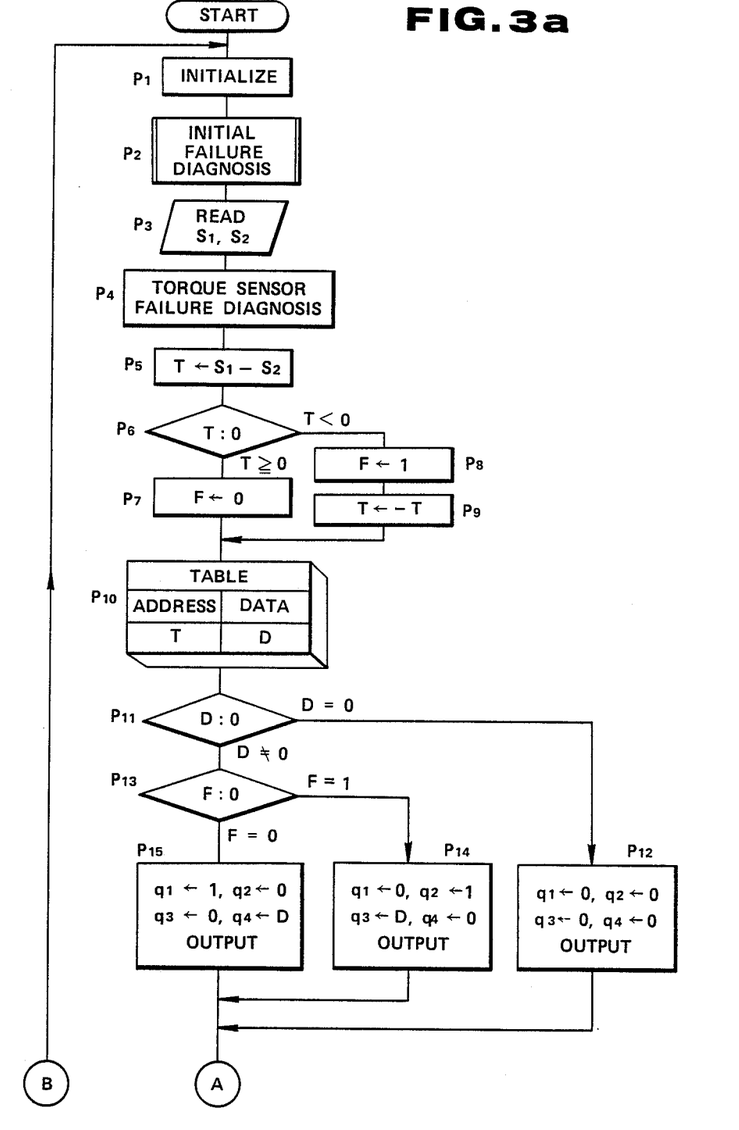
FIGS. 3a and 3b are a flowchart of a processing sequence of a microcomputer in the motor control device.
Figure 3B:
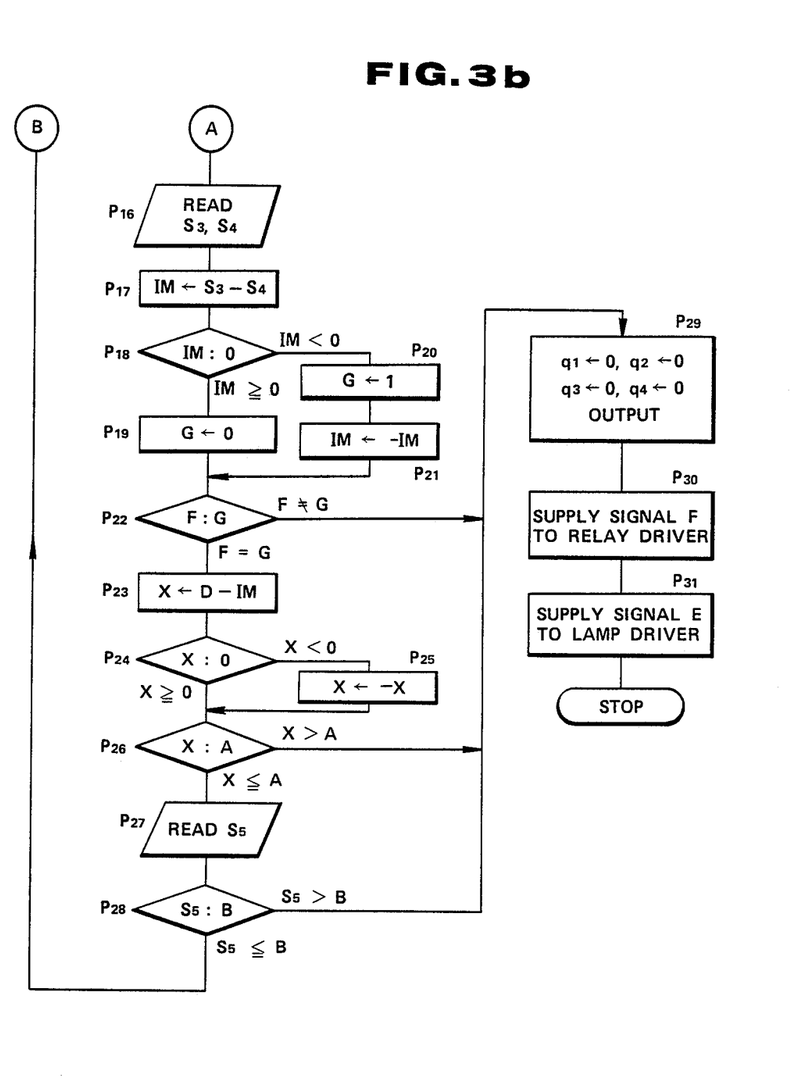

Operation of the motor control device will be described with reference to a processing sequence shown in FIGS. 3a and 3b.

When the ignition key of the engine is operated to close the key switch 63, the microcomputer 72 starts to execute a sequence of operation steps (described below) for controlling the operation of the motor 31.

In a step P1, the microcomputer 72 is initialized to erase data stored in its RAM and perform other initializing processes. Then, the torque sensor 46, the torque interface 68, the relay circuits 68, 81, and the switching circuit 77 are initially diagnosed for failure according to a subroutine in a step P2. More specifically, the torque sensor 46 and the torque interface 68 are diagnosed by reading signals S1, S2, calculating their mean value (S1+S2/2), and ascertaining whether the mean value (S1+S2/2) lies within a range a indicated by the broken lines in FIG. 4. If the mean value (S1+S2/2) lies within the range a, then the torque sensor 46 and the torque interface 68 are judged as being normal. If the mean value (S1+S2/2) lies outside the range a, then the torque sensor 46 and the torque interface 68 are judged as malfunctioning. The relay circuit 67 is diagnosed by checking a signal S5 from the current interface 70 when the FETs Q1, Q3 or the FETs Q2, Q4 are simultaneously turned on while the relay circuit 67 is de-energized. The relay circuit 67 is judged as being normal if the signal S5 is zero, and as not being normal if the signal S5 is not zero. Likewise, the relay circuit 81 is diagnosed by checking signals S3, S4, S5 from the current interfaces 69, 70 when the FETs Q1, Q4 are simultaneously turned on while the relay circuit 67 is energized and the relay circuit 81 is de-energized, and also checking signals S3, S4, S5 when the FETs Q2, Q3 are simultaneously turned on after the FETs Q1, Q4 have been turned on. The relay circuit 81 is judged as being normal if all of the signals S3, S4, S5 are zero, and as not being normal if at least one of the signals S3, S4, S5 is not zero. In the step P2, if the torque sensor 46, the torque interface 68, and the relay circuits 67, 81 are found normal, then the relay circuit 81 is turned on to diagnose the switching circuit 77. The switching circuit 77 is diagnosed by simultaneously turning on the FETs Q1, Q2 and checking signals S3, S4, S5 from the current interfaces 69, 70. If these signals are zero, the switching circuit 77 is judged as being normal, and if not, the switching circuit 77 is judged as malfunctioning. Then, the FETs Q3, Q4 are simultaneously turned on, and signals S3, S4, S5 from the current detectors 79, 80 are checked for the diagnosis of the switching circuit 77. If the switching circuit 77 is normal, then control goes to a next step P3. If not normal, then the warning lamp 66 is energized, all processing is stopped, and the relays 67, 81 are turned off.

The step P3 reads signals S1, S2 from the torque sensor 46. In a step P4, the torque sensor 46 is diagnosed for failure according to a subroutine in the same manner as with the step P2. Control goes to a step P5 only when the torque sensor 46 is found normal in the step P4.

Figure 4:
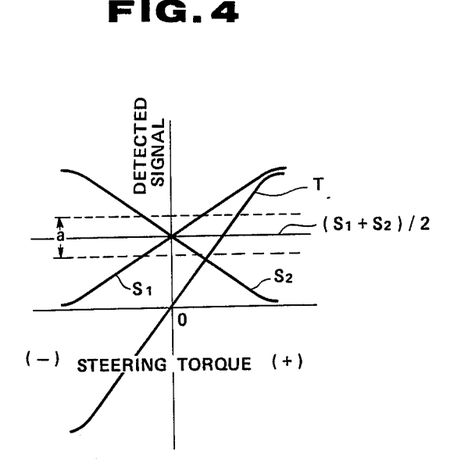
FIG. 4 is a diagram showing the characteristics of a detected torque signal.

In the step P5, the signal S2 is subtracted from the signal S1 to generate a signal T indicative of a steering torque (hereinafter referred to as a "steering torque T"). As shown in FIG. 4, the steering torque T becomes positive or negative dependent on the direction in which it is applied, and the absolute value of the steering torque T represents the magnitude thereof. A next step P6 ascertains whether the steering torque T is positive or negative If the steering torque T is positive or zero, then a flag F is set to 0 in a step P7. If the steering torque T is negative, then the flag F is set to 1 in a step P8 and the sign of the steering torque T is inverted (i.e., its absolute value is determined). The flag F indicates the direction in which the steering torque T is applied. For example, 1 represents a rightward direction whereas 0 a leftward direction.

Figure 6:
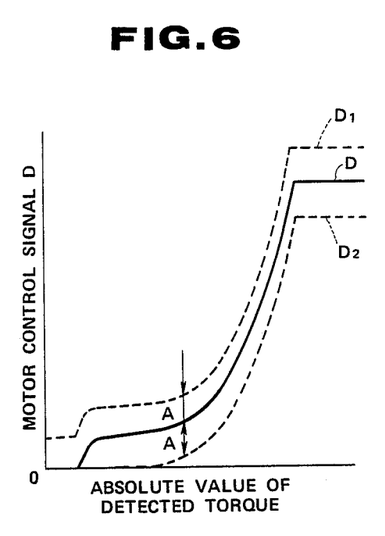
FIG. 6 is a diagram showing the characteristics of a motor control signal.

In a step P10, a data table shown in FIG. 6 is searched for an assistive torque D by using the absolute value of the steering torque T as an address, and an internal signal indicative of the assistive torque D is generated (hereinafter referred to also as a "steering assistive torque D"). The assistive torque signal is a signal representative of the magnitude of an assistive torque to be generated by the motor 31, and also indicates the duty cycle of a PWM control signal for controlling the current flowing through the motor 31.

A next step P11 ascertains whether the assistive torque T is 0 or not. If the assistive torque is 0, then the signals q1, q2, q3, q4 are all set to 0 and issued in a step P12. If the assistive torque is not 0, then control proceeds to a step P13.

The step P13 checks the flag F. If the flag F is 1, then the signals q1, q2, q3, q4 are set to 0, 1, D, 0, respectively, and issued in a step P14. If the flag F is 0, then the signals q1, q2, q3, q4 are set to 1, 0, 0, D, respectively, and issued in a step P15. Through the steps P14, P15, the motor 31 is energized in a PWM mode with the duty cycle D for generating a desired assistive torque.

Figure 5:
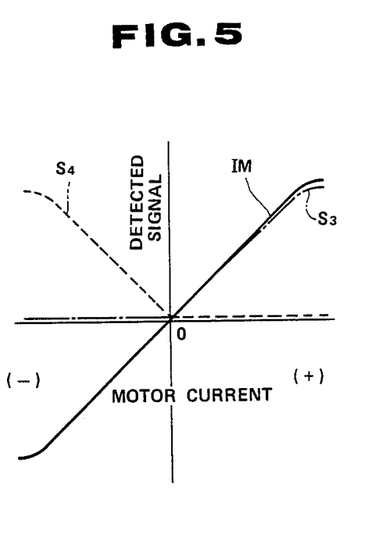
FIG. 5 is a diagram showing the characteristics of a detected motor current signal.

A next step P16 reads output signals S3, S4 from the current interface 69. In a step P17, the signal S4 is subtracted from the signal S3 to generate a signal indicative of a current to be passed through the motor 31 (hereinafter referred to as a "motor current IM"). As illustrated in FIG. 5, each of the signals S3, S4 represents the magnitude of a current flowing in one direction. Therefore, the motor current IM indicates the positive or negative value of a current dependent on the direction in which the current flows.

A step P18 checks if the motor current IM is positive or negative. If the motor current IM is positive or zero, then a flag G is set to 0 in a step P19. If the motor current IM is negative, then the flag G is set to 1 in a step P20 and the sign of the motor current IM is inverted to determine its absolute value in a step P21. The flag G indicates the direction in which a current flows through the motor 31, i.e., the direction in which the assistive torque D generated by the motor 31 is applied. As with the flag F, the flag G as set to 1 indicates a rightward direction, and the flag G as set to 0 indicates a leftward direction.

A step P22 ascertains whether the flags F, G have the same value or not. If the flags F, G are of the same value, then control goes to a step P23. IF the flags F, G are of different values, then steps P29 through P31 are executed. In a step P23, the motor current IM is subtracted from the steering assistive torque D to find a difference X. A next step P24 ascertains whether the difference X is positive or negative. If the difference X is negative, then the absolute value of the difference X is determined in a step P25. If the difference X is positive of zero, then control directly goes to a step P26.

The step P26 compares the magnitudes of the difference X and a prescribed allowable value A. If the difference X exceeds the allowable value A, then control execute the steps P29 through P31. If the difference X is equal to or smaller than the allowable value A, then control goes to a step P27. As shown in FIG. 6, the allowable value A defines an allowable range (having an upper limit D1 and a lower limit D2) of the motor current IM with respect to the preset steering assistive torque D.

The step P27 reads an output signal S5 from the current interface 70. The step P27 is followed by a step P27 which ascertains whether the signal S5, i.e., a signal indicative of the value of the current flowing through the switching circuit 77, is greater than a predetermined value B. The value B is selected to be greater than the current which can be passed through the motor 31, and serves to detect a failure of the switching circuit 77, such as simultaneous turning-on of the FETs Q1, Q3. If the signal S5 is equal to or smaller than the value B, then control repeatedly executes the step P3 and following. If the signal S5 is in excess of the value B, then control executes the steps P29 through P31.

In the step P29, all of the signals q1, q2, q3, q4 are set to 0 and issued. In the next step P30, a drive signal F is applied to the relay driver 75 to open the contacts of the relay circuits 67, 81. In the step P31, a drive signal E is applied to the lamp driver 74 to energize the warning lamp 66. Thereafter, the entire processing is brought to an end.

In the disclosed embodiment, the motor control device is judged as malfunctioning in the event that the directions in which the steering torque T and the steering assistive torque D are applied are different from each other (step P22), that the motor current IM exceeds the allowable range (step P26), or that a large current flows through the switching circuit 77 (step P28). If such a failure occurs, the contacts of the relay circuits 67, 81 are opened and the warning lamp 66 is energized in the steps P29, P30, P31

If a failure such as simultaneous turning-on of the FETs Q1, Q4 of the switching circuit 77 is developed when no manual steering operation is effected, the motor 31 generates a leftward steering assistive torque and the flag G is set to 0. In counteracting the generated steering assistive torque, the driver turns the steering wheel to the right, and the torque sensor 46 detects the rightward manual steering force, whereupon the flag F is set to 1. Therefore, this failure is quickly detected by comparison between the flags F, G irrespective of the magnitude of the current flowing through the motor 31, and hence the motor 31 is de-energized with quick response.

With the motor-operated power steering apparatus of the present invention, as described above, in the event that the direction in which the assistive power generated by the motor is applied and the direction in which the manual steering force is applied to the steering wheel are different from each other, the motor control device is judged as malfunctioning, and the motor is de-energized. Accordingly, the failure is detected reliably and quickly irrespective of the condition of the road on which the vehicle is running. The failure diagnosis of the motor-operated power steering apparatus is therefore highly reliable. The driver is given a good steering feeling by the motor-operated power steering apparatus.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-operated power steering apparatus comprising:
 a steering force transmitting a manual steering force applied to a steering wheel to a steerable road wheel;
 an electric motor for generating assistive power;
 an auxiliary power transmitting mechanism for transmitting the assistive power generated by said electric motor to said steering force transmitting mechanism;

motor control means for controlling operation of said electric motor in response to the manual steering force;

first direction detecting means disposed in said steering force transmitting mechanism for detecting the direction of said manual steering force and generating a signal indicative of said direction of the manual steering force;

second direction detecting means for detecting the direction of the assistive power generated by said electric motor and generating a signal indicative of said direction of the assistive power;

ascertaining means for ascertaining whether the direction of the manual steering force and the direction of the assistive power are the same as each other based on the signals from said first and second direction detecting means; and assistive power interrupting means for de-energizing said motor when the direction of the manual steering force and the direction of the assistive power are different from each other.

2. A motor-operated power steering apparatus according to claim 1, wherein said first direction detecting means comprises a torque sensor for detecting the torque applied from the steering wheel to the steerable road wheel, and said second direction detecting means comprises a current detector for detecting the direction of a current flowing through said motor.

3. A motor-operated power steering apparatus according to claim 2, wherein said steering force transmitting mechanism includes a steering gear mechanism having a rack shaft and a pinion shaft, and said torque sensor comprises a differential transformer for detecting the torque applied to said pinion shaft and generating a signal indicative of the magnitude and direction of said applied torque.

4. A motor-operated power steering apparatus according to claim 1, wherein said motor control means includes a control circuit and a driver circuit, said assistive power interrupting means including a relay circuit connected between said driver circuit and said motor, said relay circuit being openable when the direction of the manual steering force and the direction of the assistive power are different from each other.

5. A motor-operated power steering apparatus according to claim 4, further including a battery for supplying electric power to said motor, said assistive power interrupting means further including a relay circuit connected between said battery and said driver circuit, said relay circuits being openable when the direction of the manual steering force and the direction of the assistive power are different from each other.

* * * * *

UNITED STATES PATENT AND TRADEMARK OFFICE
CERTIFICATE OF CORRECTION

PATENT NO. : 4,799,566
DATED : January 24, 1989
INVENTOR(S) : Yasuo SHIMIZU

It is certified that error appears in the above-identified patent and that said Letters Patent is hereby corrected as shown below:

Column 8, line 63 "force transmitting" should read --force transmitting mechanism for transmitting--.

Signed and Sealed this

Fifth Day of September, 1989

*Attest:*

DONALD J. QUIGG

*Attesting Officer*  *Commissioner of Patents and Trademarks*